(12) United States Patent
Rosberg et al.

(10) Patent No.: US 6,473,954 B1
(45) Date of Patent: Nov. 5, 2002

(54) MOUNTING TOOL FOR HYDROMECHANICAL CHUCK

(75) Inventors: Niclas Rosberg, Linköping (SE); Mats Allard, Sandviken (SE); Werner Iseli, Cham (CH)

(73) Assignees: ETP Transmission AB (SE); AB Sandvik Coromant (SE); Abnox Ltd. (CH)

( * ) Notice: Subject to any disclaimer, the term of this patent is extended or adjusted under 35 U.S.C. 154(b) by 40 days.

(21) Appl. No.: 09/709,416

(22) Filed: Nov. 13, 2000

(30) Foreign Application Priority Data

Nov. 16, 1999 (SE) ............................................... 9904139

(51) Int. Cl.⁷ ..................... B23P 19/027; B23B 31/30; F16N 3/12
(52) U.S. Cl. ..................... 29/243; 141/126; 279/2.06; 279/158; 279/4.09; 403/31; 184/105.2
(58) Field of Search ............................. 279/2.06, 2.08, 279/2.09, 4.01, 4.03, 4.07–4.09; 29/242, 243; 141/104, 126, 127, 236, 285; 184/105.2; 403/31

(56) References Cited

U.S. PATENT DOCUMENTS

| | | | | |
|---|---|---|---|---|
| 4,226,571 A | * | 10/1980 | Ostling et al. ............... | 417/234 |
| 5,201,842 A | * | 4/1993 | Elsner ......................... | 403/15 |
| 5,979,911 A | * | 11/1999 | Rinne ......................... | 279/4.08 |
| 6,224,067 B1 | * | 5/2001 | Lindstrom .................. | 279/4.09 |

* cited by examiner

Primary Examiner—Steven C. Bishop
(74) Attorney, Agent, or Firm—Larson & Taylor, PLC

(57) ABSTRACT

A mounting tool for a hydromechanical chuck or mandrel of the type which is clamp connected using a pressure medium in order to clamp connecting a shaft or a shaft tool or a working piece, and in which said shaft or working piece is dismantled from the chuck, and which chuck using a pressure medium in the opposite direction, and which chuck is formed with two separate pressure chambers, a first chamber acting as a clamp connection chamber, and a second chamber acting as a dismantling chamber, which chambers are formed with inlets/outlets provided on opposite sides of the chuck and opening at the periphery thereof. The mounting tool is formed as a yoke (2) adapted to stridingly engage the chuck or mandrel to be actuated, said yoke having a first leg (4) formed with a fixed nozzle (8) and the second leg (5) formed with an axially displaceable nozzle (9), both nozzles adapted to engage the two opposite inlets/outlets of the chuck to be activated, and each leg (4, 5) formed with a passageway (6, 7) for directing pressure medium into and out of the nozzle (8, 9). The yoke (2) is substantially U-shaped having the legs thereof (4, 5) so widely spaced as to be able to engage differently wide chucks.

9 Claims, 3 Drawing Sheets

MOUNTING TOOL FOR HYDROMECHANICAL CHUCK

TECHNICAL FIELD

The present invention generally relates to a mounting tool for a hydromechanical chuck or a hydromechanical mandrel of the type which is pressurized by means of a pressure medium for clamp connecting a shaft or a shaft tool or a working piece and which is dismantled for releasing said shaft or working piece from the chuck, and which for the purpose is formed with two separate pressure chambers, a pressurization chamber for clamp connecting the tool or work piece and a dismantling chamber for releasing the tool or work piece from the chuck or mandrel, and which for this purpose is formed with inlets/outlets provided on opposite sides of the chuck and opening at the periphery surface thereof.

Figure 2:
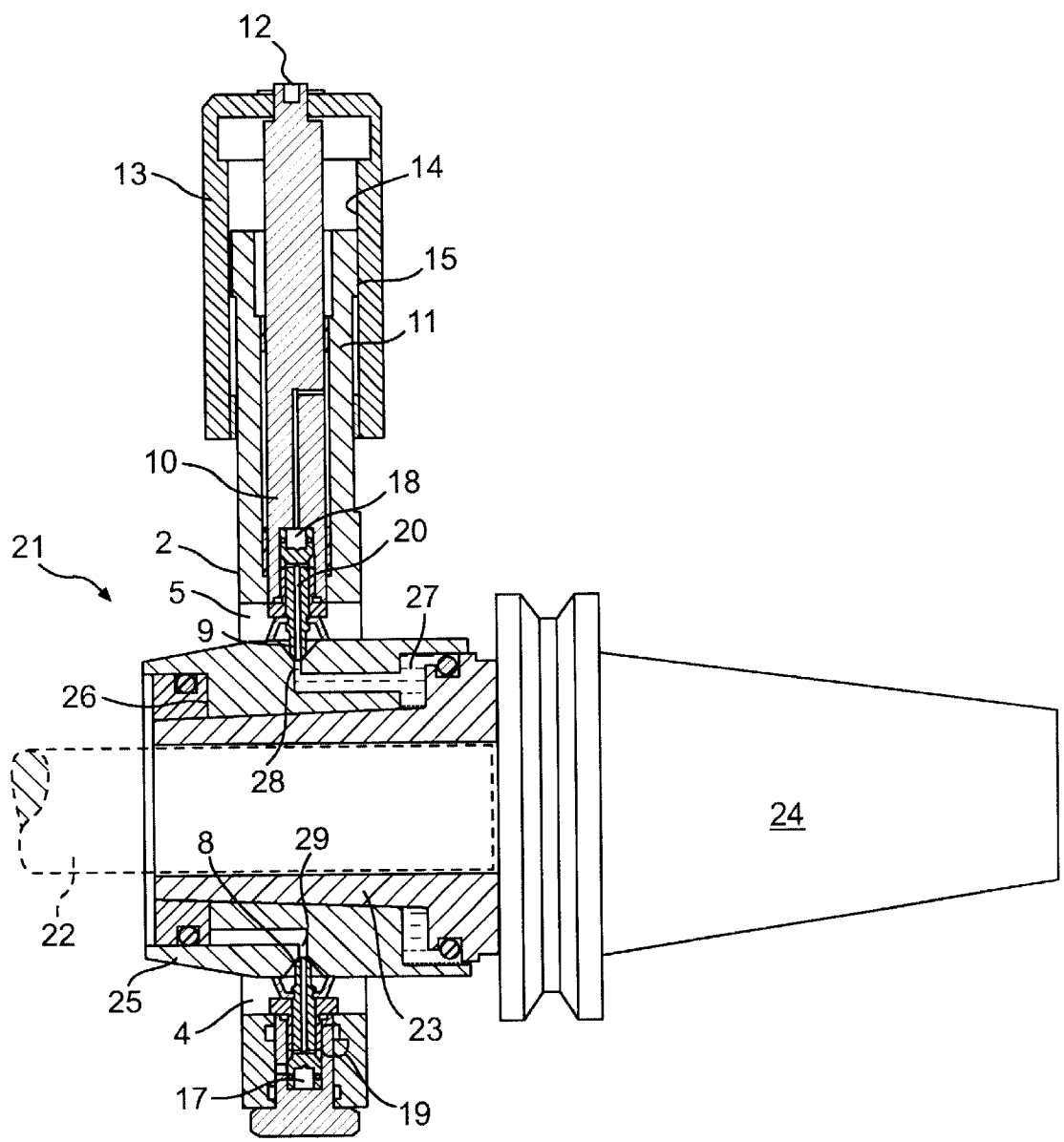
Figure 3:
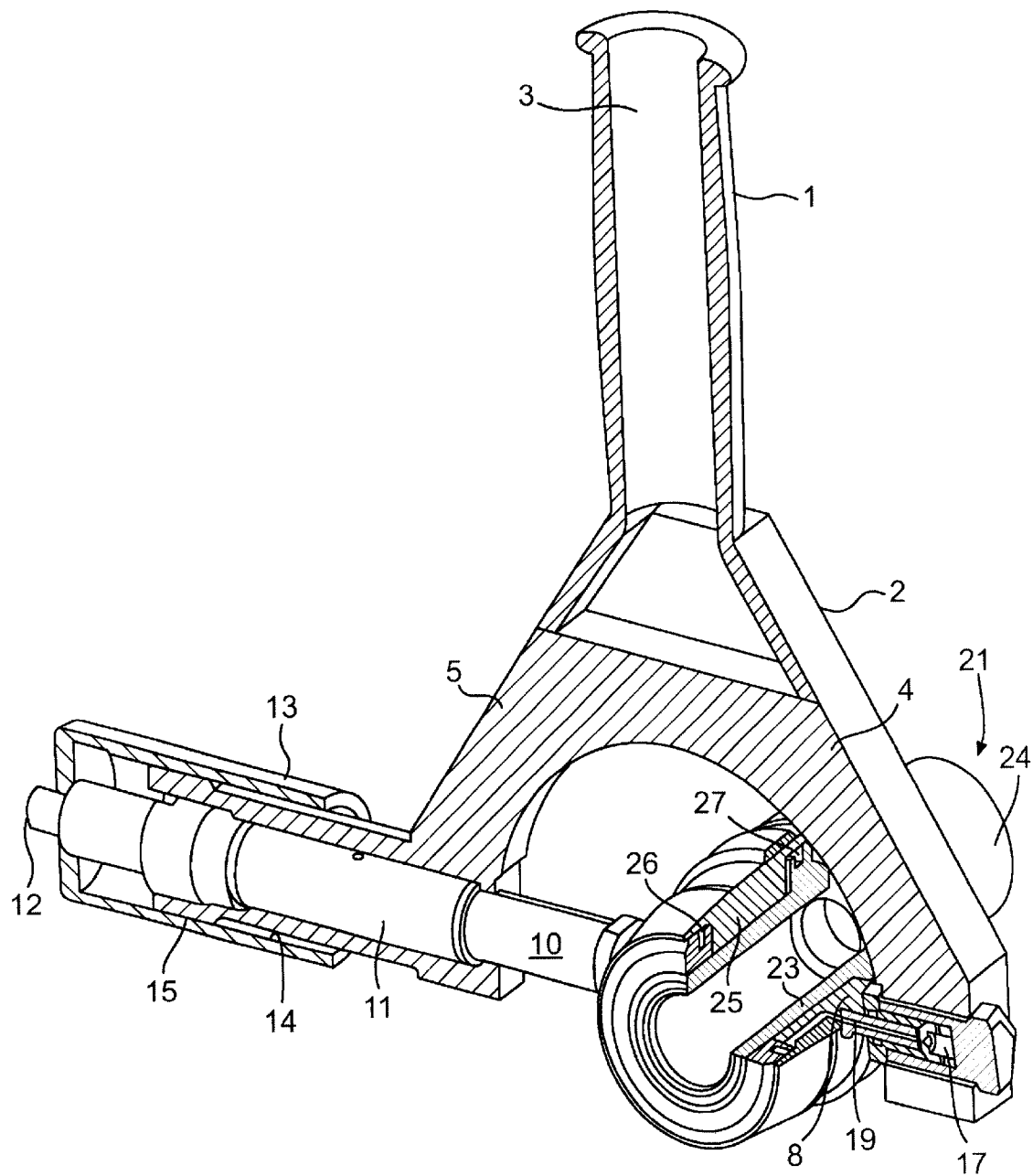

In FIGS. 2 and 3 of the attached drawings there is shown, as one out of several examples, a hydromechanical cone coupling chuck formed by an inner sleeve having a conical outer surface and a central bore in which the shaft of a tool is adapted to be clamp connected, and an outer sleeve which is axially displaceable on the conical outer surface of said inner sleeve, and having two separate hydraulic actuation systems for displacement of the outer sleeve on the inner sleeve, a first system for displacement of the outer sleeve in clamp direction and a second system for displacement of the outer sleeve in a direction for releasing the tool.

It is, however, to be understood that the invention is useful for many other types of hydromechanical clamps than the chuck illustrated in the attached drawings, for instance a hydromechanical mandrel.

PRIOR ART

Conical mechanical chucks or mandrels are known in the art, in which the clamping means are of purely mechanical type, like screws, nuts, threads etc. For pressurizing and dismantling, respectively, of a hydromechanical chuck or mandrel of the above mentioned type it has been suggested to use a separate, external pressurization means which is connected to the inlet/outlet of the hydraulic pressurization and dismantling chamber, respectively. There are problems involved in such activation of the clamp bushing or mandrel. For instance, upon pressurization of the clamp connection chamber hydraulic oil is pressed out from the dismantling chamber, and upon introducing pressure fluid in the dismantling chamber an equivalent amount of fluid is pressed out from the clamp pressure chamber; the connection of the pressure source can be complicated and time consuming; there is generally a need for using thread, screw or nut connections for mounting of the pressure source means.

OBJECT OF THE INVENTION

The object of the present invention is to provide a simple and useful mounting tool for use in connection to hydromechanical chucks or mandrels etc. of the above mentioned type, which tool is adjustable for use in connection to chucks or mandrels etc. having different diameters, which can be quickly and easily connected to the chuck etc., which is connected both to the inlet/outlet of the clamp connection chamber and to the inlet/outlet of the dismantling chamber by a fluid system operating concurrently at both pressure chambers, which is connected to the chuck simply by forcing pressure pistons into contact with said inlets/outlets of the pressure chambers, and in which said pressure pistons are sealed more strongly against the chuck inlets/outlets as the inlet pressure is increased, which pressure pistons are spring biased, so that the evacuation piston becomes pressed back, which can likewise quickly and simply be released, in which the pressurization and dismantling, respectively, can quickly and simply be reversed by means included in the mounting tool, which automatically receives pressure medium which is evacuated from any of the chambers, so that there is no waste and overflow of oil/fat from the chuck.

SHORT DESCRIPTION OF ATTACHED DRAWINGS

Figure 1:
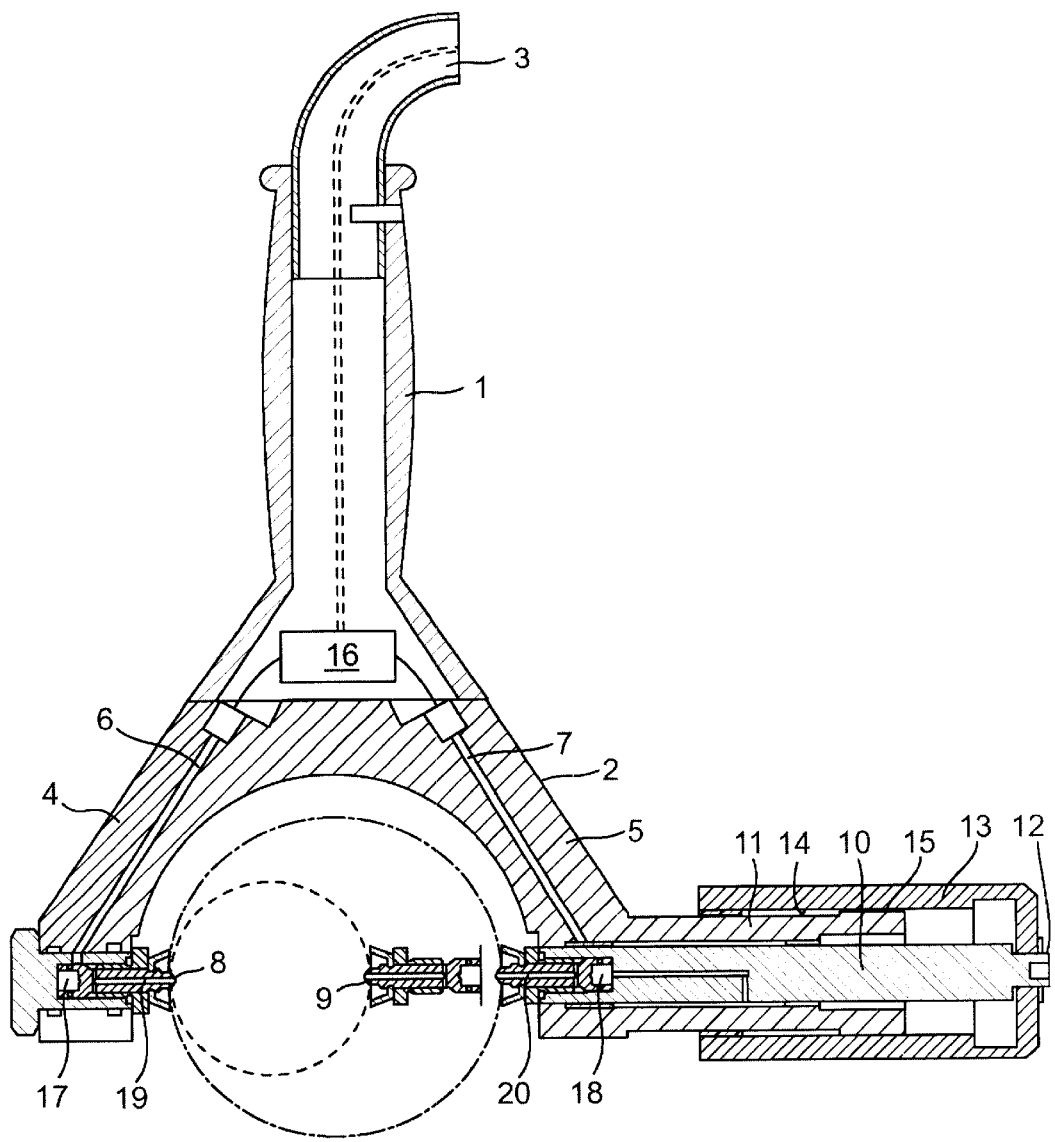

Now the invention is to be described more in detail with reference to the accompanying drawings, in which FIG. 1 shows a cross section view of a mounting tool according the invention, FIG. 2 shows another cross section view of the tool while used in connection to a type of hydromechanical chuck, and FIG. 3 is a perspective cross section view of the mounting tool according to the invention used in combination with a hydromechanical chuck.

DETAILED DESCRIPTION OF THE INVENTION

The mounting tool shown in the drawing generally comprises a handle 1 which at one end is formed with a generally U-shaped yoke 2, or a ring, adapted to be moved stridingly over the chuck (or mandrel etc.) to be pressurized or dismantled, and which at the opposite end is formed with means 3 for supply of pressure medium to the each hydraulic clamp connection/dismantling chambers of the chuck. Each leg 4 and 5 of the yoke 2 is formed with passageways 6, 7 for supply of pressure medium to a pressure nozzle 8, 9 with a splash protection cup at the end of each leg. The flow of fluid is moved round the tool and is sealed at both opposite sides of the clutch. The left nozzle 8, as seen in FIG. 1, is fixed mounted to the leg 4, the right nozzle 9 is mounted at the end of a nozzle carrier 10 which is axially displaceable in a sleeve 11 which is integral with the right yoke leg 5. At the outer end 12 of the nozzle carrier 10, which extends out of the sleeve 11 there is rotatably mounted a hollow nut 13 formed with inner threads 14 co-operating with outer threads 15 at the outer end of the sleeve 11. By turning the hollow nut 13 the shaft like nozzle carrier 10 is moved to the left or to the right on the sleeve 11, as shown diagrammatically in FIG. 1. By turning the nut 13 in the clamp connection direction the right nozzle is moved closer to the left nozzle 8 so as to engage the chuck. At the same time the left nozzle is moved into contact with the opposite side of the chuck. By turning the nut 13 in the opposite direction the nozzles are moved apart from the chuck.

As indicated with the dotted circles in FIG. 1 the mounting tool can be used for chucks of widely differing diameters only by turning the hollow nut 13, acting like a micrometer screw, in or out in the sleeve 11.

For distributing the pressure medium entering at the pressure inlet 3 there is a distribution box 16 which can be mounted in the handle 1 or the tool, and from which box 16 pressure oil or fat is pressed through the passageway 6 or 7, which passageways are in direct communication with pressure chambers 17, 18 and with the nozzles 8 and 9 and with axial bores 19 and 20 thereof. The distribution box 16 is formed with means for reversing the direction of distribution of pressure medium so as to supply pressure medium to the left nozzle 8 or the right nozzle 9, respectively, and concurrently therewith allowing escape of evacuated oil or fat from the opposite nozzle.

In FIG. 2 the mounting tool is shown during pressurization of a chuck 21 adapted to clamp connecting a shaft 22, e.g. a shaft of a tool. Said chuck is only one, out of many different types of mounting means which can be handled by the mounting tool means of the invention. In the illustrated case the chuck is formed with an inner sleeve 23 which is integral with a mounting cone 24 for mounting of the chuck in a working machine (not shown), and with an outer sleeve 25 which is axially displaceable on the inner sleeve 23. Between said inner and outer sleeves there are formed two separate pressure chambers, a first chamber 26 for tightening the outer sleeve 25 on the inner sleeve 23 thereby clamp connecting the tool shaft 22 in the chuck, and a second pressure chamber 27 for forcing the outer sleeve 25 in the opposite direction thereby releasing the tool shaft 22. Each of the pressure chambers 26, 27 is connected to an inlet/outlet opening 28, 29, which openings are preferably provided opposite each other and opening at the periphery of the chuck.

The pressure pistons comprising the nozzles 8, 9 and the splash protection cups can be formed with different pressure areas depending on type and size of chuck to be pressurized. The nozzles 8, 9 preferably are formed with blocking means arranged to stop and seal the flow of fluid out of the nozzle when said nozzle is out of contact with the chuck. Also, the splash protection cups of the nozzles can be formed with vacuum means adapted to vacuum seal said cups against the outer periphery of the chuck while the nozzles 8 and 9 are sealed against the bottom inlets/outlets 28, 29 of the chuck during pressurization and dismantling. The splash protection cups mainly act to prevent splash of oil or fat from the nozzles 8, 9 and the inlets/outlets 28, 29 upon clamp connecting and dismantling, respectively, of the tool to/from the chuck (or mandrel).

When using mounting tool according to the invention the tool is moved with the fixed nozzle 8 into contact with one of the inlet/outlet openings 28, 29 of the chuck or mandrel, no importance which one, and the hollow nut 13 is turned in clamp connection direction so that the opposite nozzle 9 comes into contact with the other inlet/outlet opening. The nut 13 is turned enough as to secure a provide a tight seal between the chuck and the mounting tool. Pressure fluid is introduced by means of the pressure supply means 3, and the distribution box 16 is set so as to supply pressure fluid to the clamp connection chamber 26 or to the dismantling chamber 27, respectively. After the shaft 22 has been clamp connected to the chuck the mounting tool is unscrewed from the chuck and the chuck is ready for use. The mounting tool now can be used for clamp connecting or for dismantling of other chuck appliances.

Reference numerals 1 handle
2 yoke
3 pressure supply means
4 leg
5 leg
6 passageway
7 passageway
8 nozzle
9 nozzle
10 nozzle carrier
11 sleeve
12 outer end
13 hollow nut
14 inner threads
15 outer threads
16 distribution box
17 pressure chamber
18 pressure chamber
19 bore
20 bore
21 chuck
22 shaft
23 inner sleeve
24 mounting cone
25 outer sleeve
26 connection pressure chamber
27 release pressure chamber
28 inlet/outlet (of 26)
29 inlet/outlet (of 27)

What is claimed is:

1. A mounting tool for a hydromechanical chuck or mandrel of the type which is clamp connected using a pressure medium for clamp connecting a shaft (22), a shaft tool or a working piece to the chuck or mandrel and in which said shaft (22) or working piece is dismantled from the chuck or mandrel using a pressure acting in the opposite direction (22), and which is formed with two separate pressure chambers (26, 27), a first chamber (26) for pressurization of a clamp connection means of the chuck and a second chamber (27) for pressurization of a dismantling means of the chuck, and which is formed with inlets/outlets (28, 29) provided on opposite sides of the chuck and opening at the periphery surface thereof, characterized in that the mounting tool is formed as a yoke (2) or a ring adapted to stridingly engage a chuck to be actuated, a first leg (4) formed with a first nozzle (8) and the second leg (5) formed with an axially displaceable second nozzle (9), which nozzles (8, 9) are movable in relation to each other, and both nozzles adapted to engage the opposite inlets/outlets (28, 29) of the chuck to be activated.

2. A mounting tool according to claim 1, characterized in that the yoke (2) if substantially U-shaped having the legs thereof (4, 5) spaced so as to be able to engage differently wide chucks.

3. A mounting tool according to claim 1 characterized in that the axially displaceable nozzle (9) is mounted at the end of a shaft like nozzle carrier (10) which is axially movable towards and away from the fixed nozzle (8) so as to adapt the mounting tool to chucks of different sizes.

4. A mounting tool according to claim 3, characterized in that the axially movable nozzle carrier (10) with the nozzle (9) is slideable in a sleeve (11) which is integral with the yoke (2) and extends out of said sleeve (11).

5. A mounting tool according to claim 4, characterized in that there are means for axially forcing the nozzle carrier (11) with the nozzle (9) in opposite directions and comprising a hollow nut (13) having inner threads (14) engaging outer threads (15) at the outer periphery of the sleeve (11), whereby said hollow nut (13) acts like a micrometer screw.

6. A mounting tool according to claim 1, characterized in that the tool is formed with a distribution box (16) adapted to direct pressure fluid to the fixed nozzle (8) or to the axially displaceable nozzle (9), or vice versa.

7. A mounting tool according to claim 6, characterized in that the distribution box (16) is formed with means for allowing escape of pressure fluid from one of the pressure chambers (17, 18, 28, 29) of the chuck while pressurizing the other pressure chamber of said chuck.

8. A mounting tool according to claim 1, characterized in that the pressure pistons (nozzles 8, 9) are hydraulically preloaded in that they are more strongly sealed against the chuck inlet/outlet as the inlet pressure is increased.

9. A mounting tool according to claim 1, characterized in that the nozzles (8, 9) are spring loaded and in that the bores (19, 20) thereof are formed with stop means arranged to close said bores when the nozzles are out of contact with the chuck.

* * * * *